United States Patent

Nakajima

[11] Patent Number: 5,711,856
[45] Date of Patent: Jan. 27, 1998

[54] ASPHALT EXTRACTING APPARATUS

[76] Inventor: Masahiro Nakajima, 46-401 Koudanjutaku, 3-2, Takaoka 5-chome, Okubo-cho, Akashi-shi, Hyogo 674, Japan

[21] Appl. No.: 620,657

[22] Filed: Mar. 22, 1996

Related U.S. Application Data

[63] Continuation of PCT/JP95/01487, Jul. 24, 1995.

[30] Foreign Application Priority Data

Jul. 26, 1994 [JP] Japan .................. 6-194802

[51] Int. Cl.$^6$ .................. B01D 11/00; C10C 1/18; C10G 21/00
[52] U.S. Cl. .................. 196/14.52; 196/99; 208/45; 422/261; 422/269; 159/22; 159/DIG. 28
[58] Field of Search .................. 422/261, 269; 196/14.52, 98, 99; 159/22, DIG. 28; 208/41, 45

[56] References Cited

U.S. PATENT DOCUMENTS

| 1,060,010 | 4/1913 | Murray et al. | 422/261 |
|---|---|---|---|
| 2,453,633 | 11/1948 | Logan | 422/261 |
| 3,252,765 | 5/1966 | Cohen De Lara et al. | 422/261 |
| 4,017,383 | 4/1977 | Beavon | 208/309 |
| 4,088,540 | 5/1978 | Bunas | 196/14.52 |
| 4,265,860 | 5/1981 | Jennings et al. | 422/280 |
| 4,528,068 | 7/1985 | Fiocco et al. | 196/14.52 |
| 4,588,476 | 5/1986 | Warzel | 196/14.52 |
| 4,747,936 | 5/1988 | Penning | 208/51 |

FOREIGN PATENT DOCUMENTS

| 55-57038 | 4/1980 | Japan . |
| 58-19701 | 2/1983 | Japan . |
| 63-93302 | 4/1988 | Japan . |

*Primary Examiner*—Nina Bhat
*Attorney, Agent, or Firm*—Armstrong, Westerman, Hattori, McLeland & Naughton

[57] ABSTRACT

There is disclosed an asphalt extracting apparatus of the Soxhlet type in which a solvent evaporated from a flask is condensed by a cooling device and then dropped into the inside of a filter device such that asphalt in an asphalt mixture inside the filter device is extracted through the filter device. With the flask and the filter device covered with a thermally insulating case, the flask and the filter device are heated and thermally insulated by the heat of a gas burner. To lower the boiling point of the solvent in the flask, each of the flask, the filter device and the cooling device is decompressed by a decompression device.

23 Claims, 5 Drawing Sheets

Fig. 4

ASPHALT EXTRACTING APPARATUS

This application is a continuation of International Application No. PCT/JP95/01487, filed Jul. 24, 1995, and claiming priority based on Japanese Patent Application No. 194802 filed Jul. 26, 1994.

BACKGROUND OF THE INVENTION

The present invention relates to an asphalt extracting apparatus for extracting asphalt from an asphalt mixture using a Soxhlet method.

BACKGROUND ART

When an asphalt pavement is insufficient in asphalt concentration, the surface or base course thereof is liable to be cracked or come off. Thus, it is a common practice to collect an asphalt mixture forming the surface or base course from the construction site or asphalt plant, to separate and extract asphalt from the aggregate and to inspect the asphalt concentration.

As an example of the asphalt extracting apparatus for extracting asphalt, there is known an asphalt extracting apparatus of the Soxhlet type in which an asphalt extracting solvent housed in a solvent container, is heated and evaporated by a gas burner or the like, the solvent thus evaporated is introduced into a cooling device and then condensed, the solvent thus condensed is dropped onto an asphalt mixture charged in cylindrical filter paper in a filter device such that asphalt flows out from the asphalt mixture, and the aggregate which remains after asphalt elution, is then collected together with the filter paper.

In the asphalt extracting apparatus of the Soxhlet type, there is used, as an asphalt extracting solvent, a chlorine-type solvent having non-flammability and excellent in solubility with respect to asphalt such as carbon tetrachloride, ethane trichloride (1,1,1-trichloroethane) or the like. However, such a chlorine-type solvent not only exerts an adverse effect on the environment such as destruction of the ozone layer, but also is detrimental to the human body. Thus, it is determined to wholly abolish the use of such a chlorine-type solvent.

As a substitute solvent of the chlorine-type solvent, attention is now placed on D-limonene (EXIST) ("EXIST" is a trademark of YASUHARA CHEMICAL Co., Ltd.) which causes no trouble in environment and toxicity. The D-limonene is an isomer of L-limonene or DL-limonene mainly composed of 1-methyl-4-isopropenyl-1-cycrohexene, and is to be extracted and refined mainly from the epidermis of citrus fruits.

However, the boiling point of D-limonene is as high as 170° C. or more. This makes it difficult to evaporate D-limonene from the solvent container. Further, the solvent once evaporated is condensed and returned back to the solvent container before it reaches a cooling device. Thus, asphalt cannot efficiently be extracted from an asphalt mixture. For example, it takes 10 to 12 hours to extract asphalt under the conditions of normal temperature and usual pressure when ethane trichloride (of which the boiling point is about 70° C.) is used, but it takes 40 hours or more when D-limonene is used. Further, in the latter case, the filter paper in a filter device is exposed to a high temperature for a long period of time. This disadvantageously carbonizes the filter paper, causing the same to be removed with difficulty from the filter device. Thus, it is the present state that D-limonene cannot practically be used as an extracting solvent.

OBJECT AND SUMMARY OF THE INVENTION

In view of the problems above-mentioned, the present invention is proposed with the object of providing an asphalt extracting apparatus of the Soxhlet type capable of extracting asphalt in a short period of time with the use of an asphalt extracting solvent having a high boiling point such as D-limonene or the like.

To achieve the object above-mentioned, the present invention provides an asphalt extracting apparatus of the Soxhlet type having a solvent container for housing an asphalt extracting solvent, a heating means for heating and evaporating a solvent housed in the solvent container, a filter device to be charged with an asphalt mixture, and a cooling device which communicates with the solvent container and the filter device and which is arranged to cool and condense the solvent evaporated from the solvent container, whereby the solvent condensed by the cooling device is dropped into the filter device such that asphalt in the asphalt mixture is extracted through the filter device, and this asphalt extracting apparatus is characterized by comprising: a heating and thermally insulating means which surrounds the solvent container and the filter device for heating and thermally insulating the same; and a decompression means for decompressing the inside of each of the solvent container, the filter device and the cooling device.

According to the asphalt extracting apparatus having the arrangement above-mentioned, the heating and thermally insulating means can heat the solvent container and the filter device. This prevents the solvent evaporated from the solvent container from being condensed and returned back to the solvent container before the solvent reaches the cooling device. Further, the decompression means can decompress the inside of each of the solvent container, the filter device and the cooling device to lower the boiling point of the solvent. Accordingly, even a high-boiling-point solvent can efficiently be supplied to the asphalt mixture.

According to a preferred mode, the asphalt extracting apparatus of the present invention further comprises a solvent circulating means for upwardly introducing a solvent staying at a lower portion of the asphalt mixture, and circulating the same to an upper portion thereof. According to this mode, through the solvent circulating means, a solvent staying at a lower portion of the asphalt mixture can be circulated by being upwardly introduced to an upper portion of the asphalt mixture. Thus, asphalt can efficiently be extracted from the asphalt mixture. This remarkably shortens the asphalt extraction time.

As mentioned earlier, even though a chlorine-type solvent is used as the asphalt extracting solvent, asphalt extraction takes time as long as 10 to 12 hours. The inventor of this application has conducted an investigation into the cause and found that powder contained in the asphalt mixture was deposited on a lower portion of the asphalt mixture to cause the filter paper to be clogged, thus preventing asphalt from readily flowing out from the lower portion of the filter paper. Based on such a finding, the asphalt extracting apparatus having the solvent circulating means has been accomplished. According to this mode, a solvent staying at a lower portion of the asphalt mixture is circulated to introduce asphalt at the lower portion of the asphalt mixture to an upper portion thereof, such that the asphalt can efficiently be extracted through an upper portion of the filter paper which is hardly clogged.

The solvent circulating means preferably comprises: a guide tube standing at the center inside of filter paper for introducing a solvent staying at a lower portion of the asphalt mixture; and an aeration tube introduced in the guide tube for generating air bubbles at a lower portion of the guide tube. According to this mode, with the use of a decompression operation of the decompression means, air can be supplied to the inside of the guide tube through the aeration tube to generate air bubbles at a lower portion of the guide tube. This induces a solvent staying at a lower portion of the asphalt mixture to the inside of the guide tube and guides such a solvent to an upper portion of the asphalt mixture along the inside of the guide tube. This prevents asphalt from staying at a lower portion of the asphalt mixture for a long period of time. According to this mode, the solvent circulating means causes aeration with the use of a decompression operation of the decompression means. Thus, the solvent circulating means can be much simplified in structure.

According to another preferable mode, the asphalt extracting apparatus of the present invention is arranged such that the heating and thermally insulating means uses, as a heat source, a heating means for heating the solvent. According to this mode, there is no need for disposing a dedicated heat source for heating the filter device and the like. Also, the heat generated by the heating means can efficiently be used. Further, according to this mode, a metallic container is preferably interposed between the solvent container and the heating means. In such an arrangement, even though the solvent container is broken and the solvent housed therein leaks out, the leaking solvent can be housed in this metallic container. This prevents a solvent leaking from the solvent container from burning as falling down on the heating means.

In the mode where the heating and thermally insulating means uses, as a heating source, the heating means for heating the solvent, there are preferably disposed: a partition wall for partitioning, together with the metallic container, the heating means from the solvent container; a pipe standing from the top of the partition wall and provided in an upper portion thereof with a through-hole through which the heat of the heating means is introduced to the solvent container and the filter device; and a cover for preventing a solvent scattering from the filter device from entering the side of the heating means through the pipe. According to such an arrangement, even though the filter device is broken to cause the solvent housed therein to scatter, it is possible to prevent the scattering solvent from burning as falling down onto the heating means.

According to a further preferable mode, the asphalt extracting apparatus of the present invention is arranged such that the heating and thermally insulating means has a thermally insulating case which surrounds the solvent container and the filter device, the thermally insulating case being provided at a part thereof with a transparent portion through which the filter device is seen from the outside. According to this mode, the filter device can be seen through the transparent portion of the thermally insulating case from the outside thereof. It is therefore possible to observe the state of asphalt extraction in the filter device with the solvent container and the filter device always heated and thermally insulated.

DETAILED DESCRIPTION OF THE PREFERRED EMBODIMENT

The following description will discuss in detail a preferred embodiment of the present invention with reference to the attached drawings.

Figure 1:
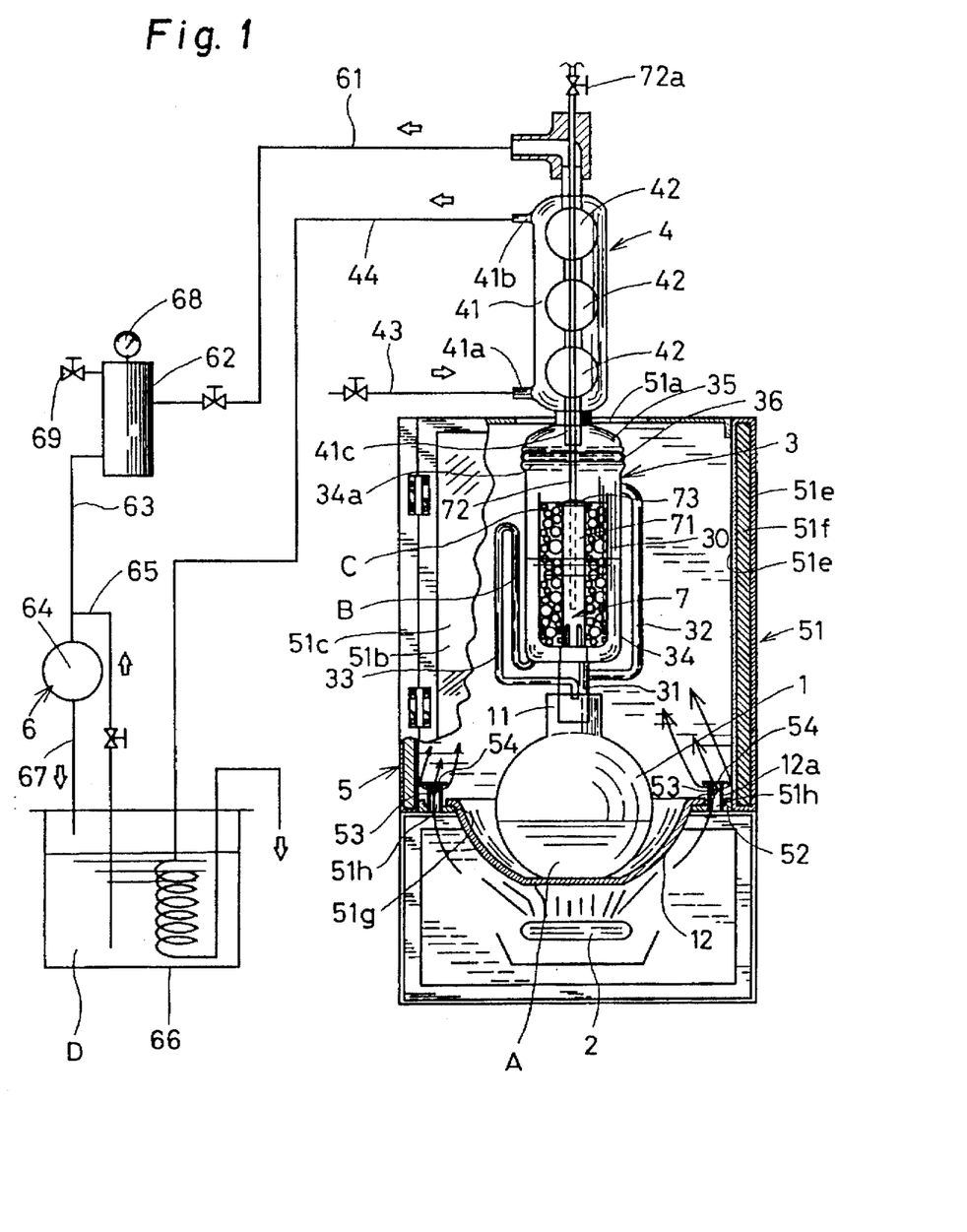
FIG. 1 is a schematic view of a preferred embodiment of an asphalt extracting apparatus according to the present invention.

FIG. 1 is a schematic view illustrating an embodiment of asphalt extracting apparatus according to the present invention. The main part of this asphalt extracting apparatus comprises: a flask 1 serving as a solvent container for housing an asphalt extracting solvent A such as D-limonene or the like; a gas burner 2 disposed immediately below the flask 1 and serving as a heating means for heating and evaporating the solvent A housed in the flask 1; a filter device 3 having filter paper 30 to be charged with an asphalt mixture C; a cooling device 4 which communicates with the flask 1 and the filter device 3, and which is arranged to cool and condense the solvent A evaporated from the flask 1 and to drop the solvent A thus condensed into the filter device 3; a heating and thermally insulating portion 5 which surrounds the flask 1 and the filter device 3 for heating and thermally insulating the same; a decompression device 6 for decompressing the inside of each of the flask 1, the filter device 3 and the cooling device 4; and a solvent circulating device 7 for upwardly introducing and circulating a solvent staying at a lower portion of the asphalt mixture C in the filter device 3.

Figure 2:
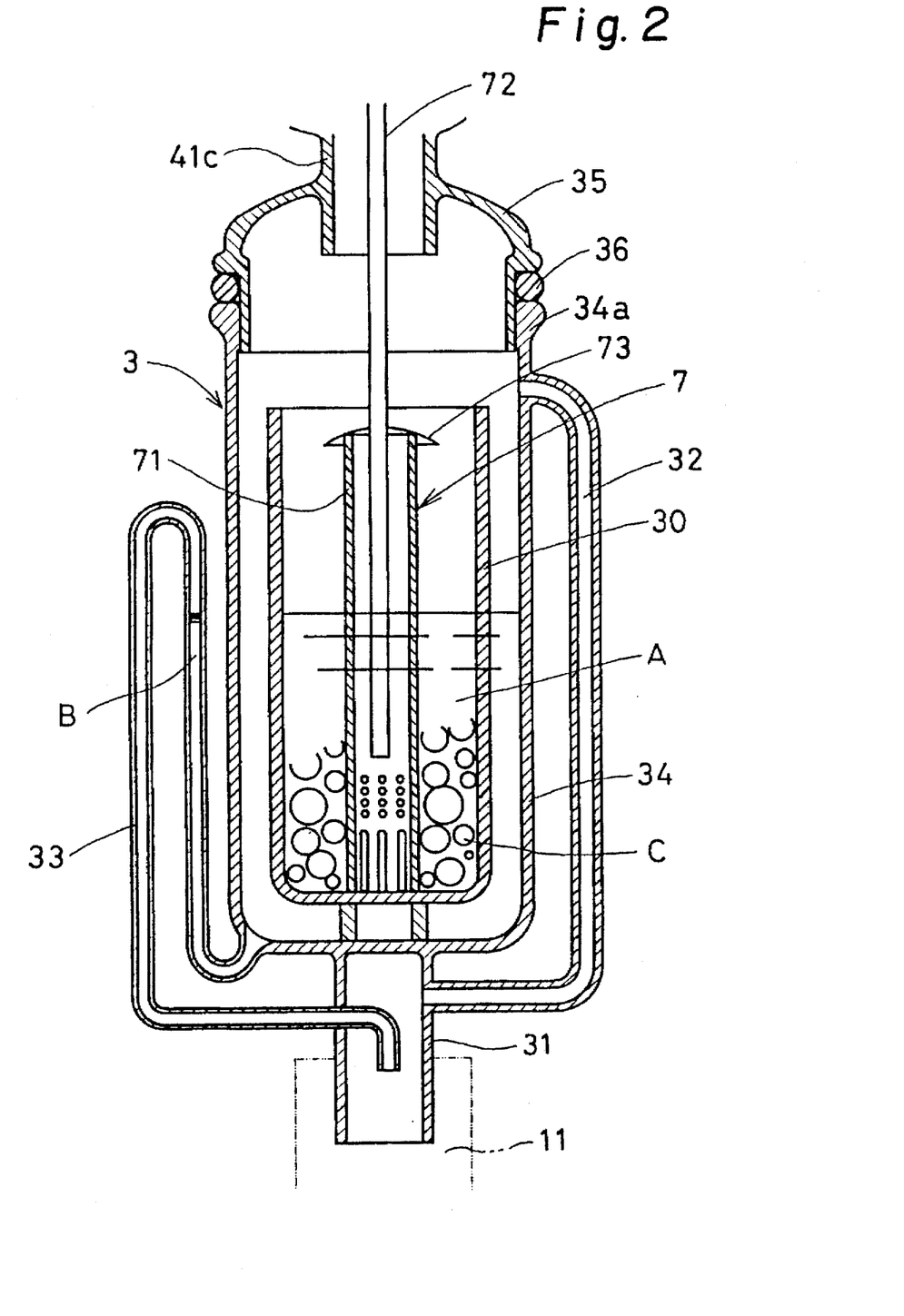
FIG. 2 is a section view of the filter device.

Hermetically fitted to an opening 11 of the flask 1 is a glass tube 31 which hangs down from the bottom of the filter device 3 (See FIG. 2). The glass tube 31 communicates with (i) a first communicating tube 32 for upwardly introducing the solvent A evaporated from the flask 1 into an upper portion of the filter device 3 and (ii) a second communicating tube 33 for returning an asphalt solution B extracted by the filter device 3 back to the flask 1. The second communicating tube 33 is introduced into the glass tube 31 after once standing upwardly from the bottom of the filter device 3.

The flask 1 is housed at the lower half portion thereof in a hemispherical metallic container 12 and arranged to be heated by the gas burner 2 through the metallic container 12. The metallic container 12 has a volume greater than that of the solvent A to be housed in the flask 1. Accordingly, in case the flask 1 is broken and the solvent A therein leaks out, the leaking solvent A can be housed in the metallic container 12. This prevents the solvent A leaking from the solvent container from burning as falling down on the gas burner 2.

The filter device 3 has a main body container 34 which is made of transparent glass and inside of which the filter paper 30 in the form of a case having a bottom is disposed (See FIG. 2). The main body container 34 is sealed by a glass cap 35, and a seal 36 such as an O-ring or the like lying between an opening 34a and the glass cap 35 assures a tight seal in the main body container 34. It is noted that the asphalt mixture C to be charged in the filter paper 30 is an asphalt mixture collected from a paved road site or an asphalt plant.

Figure 3:
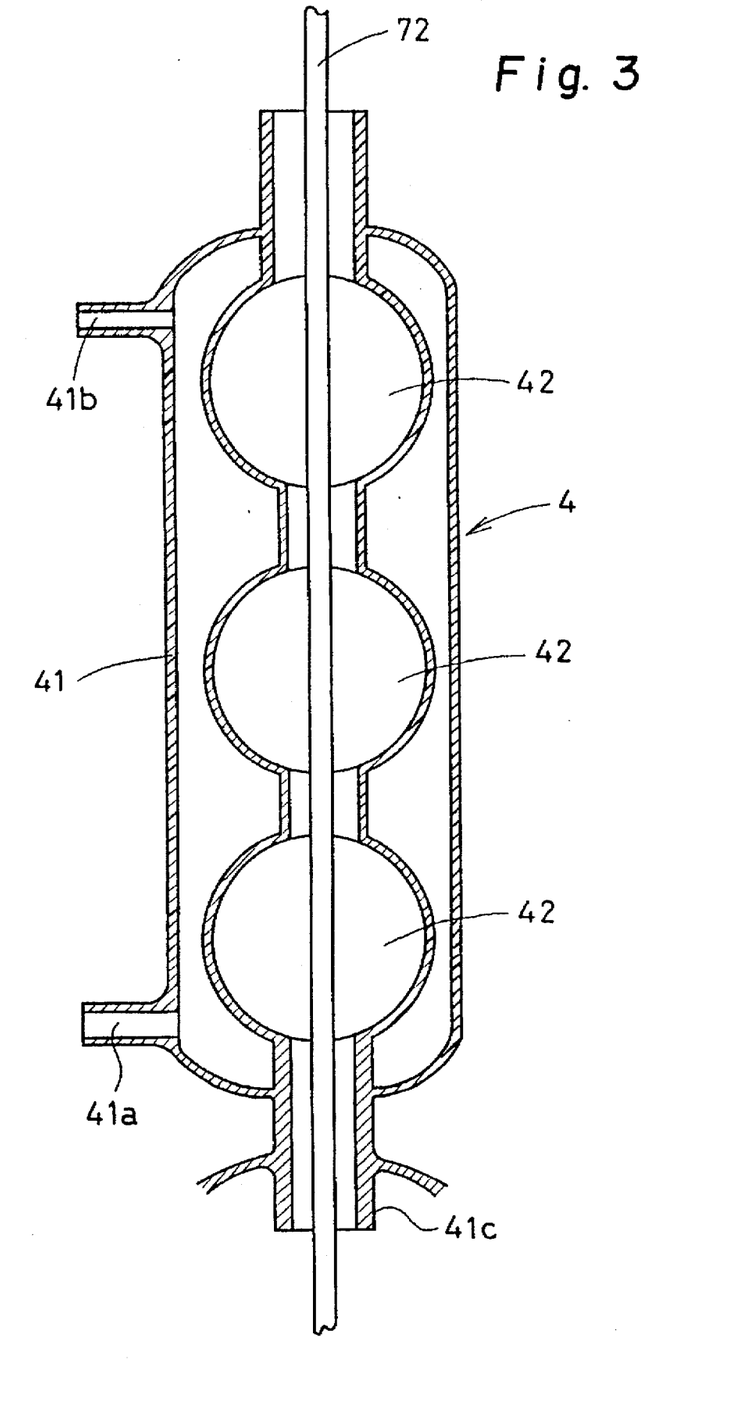
FIG. 3 is a section view of the cooling device.

The cooling device 4 made with glass comprises a case-like double-wall container 41 for circulating cooling water and a plurality of spherical spaces 42 formed at the inner periphery of the double-wall container 41, the spherical spaces 42 vertically communicating with one another (See FIG. 3). The double-wall container 41 is provided in the lateral wall thereof with a cooling water inlet port 41a and a cooling water outlet port 42b. The inlet port 41a is connected to a water supply tube 43 for supplying cooling water, and the outlet port 41b is connected to a drain tube 44 for discharging cooling water.

The spherical spaces 42 at the inner periphery of the double-wall container 41, communicate with the inside of the filter device 3 through a communicating tube 41c which hangs down from the bottom of the double-wall container 41. Thus, provision is made such that the evaporated solvent A introduced from the flask 1 to an upper space of the filter device 3 through the first communicating tube 32, is introduced into the spherical spaces 42, and that the solvent A thus introduced is cooled and condensed, and then dropped onto the asphalt mixture C in the filter device 3. The communicating tube 41c is made in a unitary structure with the cap 35 of the filter device 3. The flask 1, the filter device 3 and the cooling device 4 are respectively supported by props (not shown).

The heating and thermally insulating portion 5 comprises a thermally insulating case 51 which surrounds the flask 1 and the filter device 3. The thermally insulating case 51 is made in the form of a rectangular parallelepiped and provided in the top thereof with an opening 51a through which the communicating tube 41c of the cooling device 4 passes (See FIG. 1).

The thermally insulating case 51 is provided at the bottom thereof with a partition wall 52 for partitioning, in association with the metallic container 12, the inside of the thermally insulating case 51 from the gas burner 2. The partition wall 52 has a plurality of vent holes 51h for introducing the heat of the gas burner 2 into the thermally insulating case 51 such that the flask 1 and the filter device 3 are heated and thermally insulated with the gas burner 2 for heating the solvent A used as a heat source. Such an arrangement is more advantageous in view of cost than the arrangement where another heat source is provided. Also, such an arrangement can efficiently utilize the heat of the gas burner 2, thus contributing to energy saving.

Figure 5:
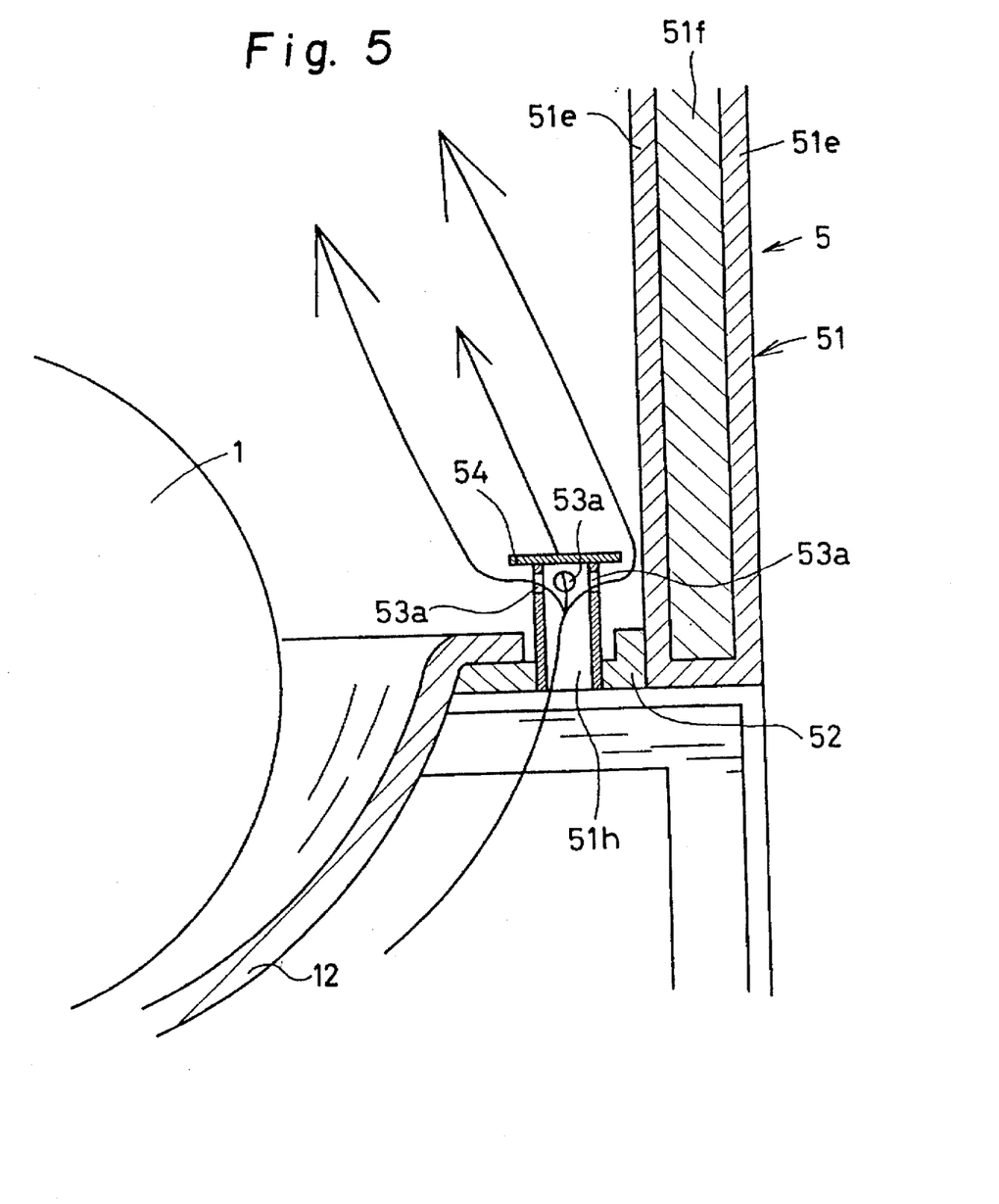
FIG. 5 is a section view of the vent hole portion.

Each of the vent holes 51h is formed by a pipe 53 (See FIG. 5). The pipe 53 stands on the top of the partition wall 52 with the inside of the pipe 53 communicating with the gas burner 2 side through a through-hole in the partition wall 52. The pipe 53 is provided in an upper portion of the peripheral surface thereof with a plurality of through-holes 53a. Thus, provision is made such that the heat of the gas burner 2 is supplied to the inside of the thermally insulating case 51 through the inside of each pipe 53 and the through-holes 53a. Each pipe 53 is covered at the top thereof with a disk-like cover 54 of which outer diameter is greater than that of the pipe 53. Thus, the pipe 53 forming each of the vent holes 51h is covered at the top thereof with the cover 54, and is provided in the upper portion thereof with the through-holes 53a for blowing the heat of the gas burner 2 to the thermally insulating case 51. Accordingly, in case the filter device 3 is broken and the solvent A therein scatters, it is possible to prevent the scattering solvent A from burning as falling down on the gas burner 2 through the vent holes 51h.

The thermally insulating case 51 is provided at the front surface thereof with an openable door 51b. The door 51b has a glass sheet 51c serving as a transparent portion through which the filter device 3 can be seen from the outside of the thermally insulating case 51. The lateral sides and back side of the thermally insulating case 51 are enhanced in thermal insulation by the arrangement in which an insulating material 51f made of glass fiber or the like is held by and between a pair of stainless sheets 51e.

The thermally insulating case 51 is provided in the partition wall 52 at the bottom thereof with an opening 51g for introducing the metallic container 12 for housing the flask 1. Thus, the metallic container 12 hangs down from the partition wall 52 by engaging the edge of an opening 12a of the metallic container 12 with the inner peripheral edge of the opening 51g.

The decompression device 6 comprises: a surge tank 62 communicating with the spherical spaces 42 of the cooling device 4 through a tube 61; a vacuum pump 64 communicating with the surge tank 62 through a tube 63; an oil reservoir tank 66 communicating with the air suction side of the vacuum pump 64 through a tube 65; and a tube 67 through which the exhaust side of the vacuum pump 64 communicates with the oil reservoir tank 66. Each of the cooling device 4, the filter device 3 and the flask 1 can be decompressed by sucking the air inside thereof by the vacuum pump 64.

The vacuum pump 64 is formed by a vane pump and arranged to suck, together with the air in the filter device 3 and the flask 1, lubricating oil D such as turbine oil or the like housed in the oil reservoir tank 66, thus assuring lubricity and airtightness between the vane and the casing. The lubricating oil D sucked from the oil reservoir tank 66 is returned back to the oil reservoir tank 66 through the tube 67.

The surge tank 62 has a manometer 68 and a decompression adjusting valve 69. By operating the decompression adjusting valve 69, the inside of each of the flask 1 and the filter device 3 can be decompressed and adjusted to a preset pressure. The preset pressure depends on the type of the solvent A to be used. For example, when D-limonene is used, the pressure is set to about 100 mmHg such that the boiling point is about 110° C.

Introduced into the oil reservoir tank 66 is the drain tube 44 for discharging the cooling water supplied to the cooling device 4, such that the lubricating oil D in the oil reservoir tank 66 is cooled. That portion of the drain tube 44 introduced in the oil reservoir tank 66, is made in the form of a coil to effectively cool the lubricating oil D.

The solvent circulating device 7 comprises: a guide tube 71 vertically disposed at the center inside of the filter paper 30 of the filter device 3; and an aeration tube 72 introduced into the guide tube 71.

Figure 4:
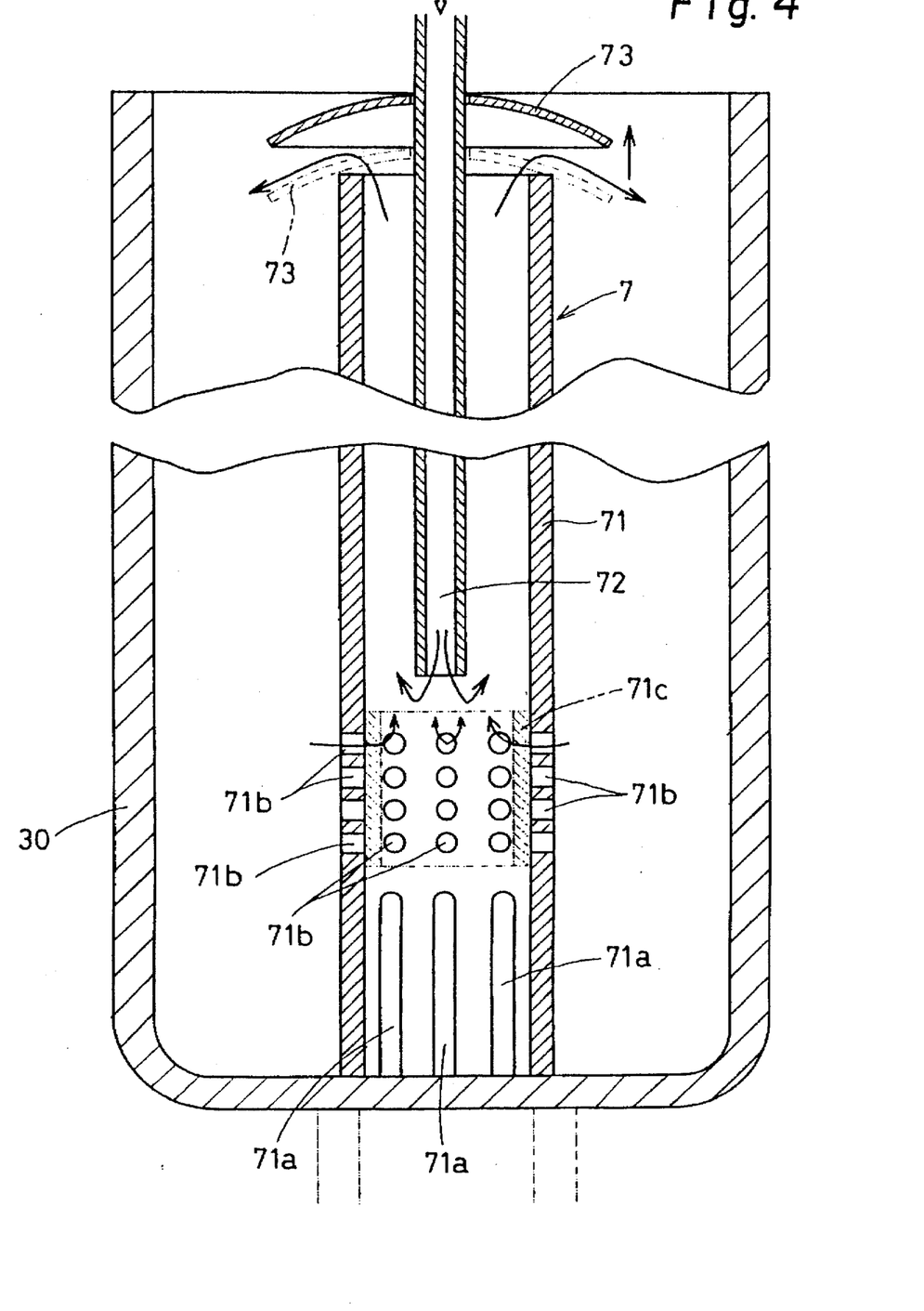
FIG. 4 is a section view of main portions of the filter device.

The guide tube 71 extends from the inner bottom portion of the filter paper 30 to a position in the vicinity of the upper end portion of the filter paper 30. As shown in FIG. 4, the guide tube 71 is provided in the lower end portion thereof with a plurality of axially extending notches 71a. The notches 71a cause the lower end portion of the guide tube 71 to be opened. The guide tube 71 is provided above the notches 71a with a large number of small holes 71b through which a solvent staying at a lower portion of the asphalt mixture C is introduced into the guide tube 71. Disposed inside of the guide tube 71 is a cylinder- or post-like filter 71c for filtering the solvent introduced to the inside of the guide tube 71 through the small holes 71b.

The aeration tube 72 is introduced into the guide tube 71 after passing through the cooling device 4 and the cap 35 of the filter device 3. The lower end of the aeration tube 72 is located in the vicinity above the small holes 71b of the Guide tube 71. The upper portion of the aeration tube 72 projects, in a hermetically sealed manner, from the upper end of the cooling device 4 into the atmosphere. An openable valve 72a is disposed at the projecting portion of the aeration tube 72.

The guide tube 71 is closed at the upper end thereof with a hemispherical cap 73. The cap 73 is vertically movable as put on the aeration tube 72. Thus, an aeration operation of the aeration tube 72 causes the cap 73 to be upwardly moved, enabling the upper end of the guide tube 71 to be opened (See FIG. 4).

The following description will discuss the operation of the asphalt extracting apparatus having the arrangement above-mentioned.

First, the solvent A is poured into the flask 1 and the filter paper 30 is charged with the asphalt mixture C. With the openable valve 72a of the aeration tube 72 closed, the inside of each of the flask 1, the filter device 3 and the cooling device 4 is decompressed by the decompression device 6. In such a decompression state, the solvent A in the flask 1 is heated and evaporated by the gas burner 2 and supplied to the spherical spaces 42 of the cooling device 4 through the first communicating tube 32 and the filter device 3. At this time, the heat of the gas burner 2 is introduced into the thermally insulating case 51 through the vent holes 51h such that the flask 1 and the filter device 3 are heated and thermally insulated. This prevents the solvent A evaporated from the flask 1 from being cooled and condensed before the solvent A reaches the cooling device 4. Further, since the inside of the flask 1 is decompressed by the decompression device 6, the boiling point of the solvent A in the flask 1 can be lowered. Thus, even a high-boiling-point solvent such as D-limonene or the like can efficiently be supplied from the flask 1 to the cooling device 4. It is preferable to maintain the inside temperature of the thermally insulating case 51 to about 100° C.

The solvent A supplied to the cooling device 4 is condensed as cooled, and then dropped onto the asphalt mixture C charged in the filter paper 30 of the filter device 3. Then, an asphalt solution B is extracted from the asphalt mixture C through the filter paper 30. When the openable valve 72a of the aeration tube 72 is opened at the time powder of the asphalt mixture C at its upper portion is moved to its lower portion to a certain extent, air is supplied to the lower portion of the guide tube 71 through the aeration tube 72 and the air thus supplied continuously rises to the surface in the form of air bubble because the inside of the filter device 3 is being decompressed. That is, aeration is conducted inside the guide tube 71. This causes a solvent which has stayed at a lower portion of the asphalt mixture C due to clogging of the lower portion of the filter paper 30 by the powder, to be induced, through a large number of small holes 71b, to the inside of the guide tube 71 together with asphalt, and to be introduced to the upper portion of the guide tube 71 and then circulated. Accordingly, asphalt of the asphalt mixture C at its lower portion can rapidly be extracted, together with the solvent, through that upper portion of the filter paper 30 which is hardly clogged.

The cap 73 disposed at the upper end of the guide tube 71 prevents the solvent introduced to the upper portion of the guide tube 71 from scattering to the outside of the filter paper 30. Further, when the aeration above-mentioned is conducted, the pressure of each of the flask 1 and the filter device 3 is adjusted by the decompression adjusting valve 69 to prevent the pressure from being increased. Such aeration may be conducted from the beginning of asphalt extraction.

When a certain amount of the asphalt solution B is extracted in the main body container 34 of the filter device 3, the asphalt solution B is returned back to the flask 1 through the second communicating tube 33.

According to the embodiment above-mentioned, even though the solvent A is a high-boiling-point solvent such as D-limonene or the like, the solvent A can efficiently be supplied to the asphalt mixture C in the filter paper 30. Thus, asphalt can quickly be extracted from the asphalt mixture C. In particular, the embodiment above-mentioned is arranged such that the solvent circulating device 7 prevents asphalt from staying at a lower portion of the asphalt mixture C for a long period of time. Thus, asphalt can further be quickly extracted. More specifically, it was made sure that, when D-limonene was used as the solvent A, the time required for extracting asphalt was reduced to about ⅓ as compared with the time conventionally taken with the use of a chlorine-type solvent. It was also made sure that, even though the solvent circulating device 7 was not used, the asphalt extraction could be conducted in a period of time substantially equal to the time conventionally taken with a chlorine-type solvent. It is therefore possible to practically extract asphalt using a high-boiling-point solvent such as D-limonene or the like which exerts no adverse effects on the environment and the human body. Further, an extraction test was conducted using, instead of D-limonene, kerosene inferior in solubility thereto. According to the test result, it was made sure that the asphalt extraction using kerosene could successfully be put into practical use even though such asphalt extraction took slightly more time than with D-limonene.

Further, the solvent circulating device 7 is arranged to circulate the solvent by conducting aeration with the use of the decompression operation of the decompression device 6. Thus, the solvent circulating device 7 can be made very simple in structure. Further, the thermally insulating case 51 is provided at the front side thereof with the glass sheet 51c through which the filter device 3 can be seen from the outside. Accordingly, the extraction state of the asphalt solution B can be made sure from the outside without the thermally insulating case 51 opened/closed. Thus, the heating and thermally insulating state inside the thermally insulating case 51 can always be maintained in a good manner. Therefore, asphalt extraction is further efficiently conducted.

The asphalt extracting apparatus of the present invention is not limited to the embodiment above-mentioned, but a variety of modifications in design may be made. For example, an electric heater or the like may be used instead of the gas burner 2, or other pump than the vane pump may be used as the vacuum pump 64. Further, the solvent circulating device 7 may be arranged to agitate a solvent staying at a lower portion of the asphalt mixture C with the use of compressed air, an agitating blade or the like. Further, the heating and thermally insulating portion 5 may have a dedicated heat source such as an electric heater or the like. A plurality of series of the flask 1, the gas burner 2, the filter device 3, the cooling device 4 and the thermally insulating case 51 may be formed.

What is claimed is:

1. An extracting apparatus comprising:

a solvent container for housing an extracting solvent, a heater for heating and evaporating said extracting solvent housed in the solvent container, a filter device for holding a mixture, a cooling device which communicates with the solvent container and the filter device and which is arranged to cool and condense solvent evaporated from the solvent container, whereby the solvent condensed by the cooling device is dropped into the filter device such that an extraction material in the mixture is extracted through the filter device, and a decompressor for decompressing the inside of said solvent container and said filter device to a pressure less than a pressure immediately exterior to said extracting apparatus.

2. An extracting apparatus according to claim 1, further comprising a solvent circulating means for, within said filter device, upwardly introducing and circulating a solvent staying at a lower portion of said mixture, to an upper portion thereof.

3. An extracting apparatus according to claim 1, further comprising:
heating means for heating and evaporating said solvent; and
heating and thermally insulating means, surrounding said solvent container and said filter device, for heating said filter device with heat generated by said heating means, and for insulating said solvent container and said filter device from an exterior of said extracting device.

4. An extracting apparatus according to claim 3, further comprising a metallic container interposed between said solvent container and said heating means.

5. An extracting apparatus according to claim 1, further comprising:
a thermally insulating case which surrounds said solvent container and said filter device, said thermally insulating case being provided at a part thereof with a transparent portion through which said filter device is seen from the outside.

6. An extracting apparatus according to claim 1, wherein said decompressor decompresses the inside of said solvent container and said filter device to less than one atmosphere.

7. An extracting apparatus according to claim 1, wherein said decompressor decompresses said cooling device to a pressure less than a pressure less than a pressure exterior to said extracting apparatus.

8. An extracting apparatus according to claim 1, further comprising:
a solvent circulator, circulating said solvent in liquid form within said filter device from a lower portion of said filter device to an upper portion of said filter device.

9. An extracting apparatus according to claim 8, wherein said solvent circulator circulates solvent by emitting gas bubbles at said lower portion of said filter device.

10. An extracting apparatus according to claim 1, wherein said filter device includes filter paper to allow said solvent and said extraction material to seep through said filter paper.

11. An extracting apparatus according to claim 1, wherein said extracting apparatus is a Soxhlet extracting apparatus.

12. An extracting apparatus according to claim 1, further comprising said extracting solvent.

13. An extracting apparatus according to claim 12, wherein said extracting solvent has a boiling point of 170 degrees Celsius or higher at one atmosphere.

14. An extracting apparatus according to claim 13, wherein said extracting solvent is D-limonene.

15. An extracting apparatus according to claim 1, wherein said mixture is an asphalt mixture and said extracting apparatus extracts asphalt from said asphalt mixture.

16. An extracting apparatus comprising:
a solvent container for housing an extracting solvent,
a heater for heating and evaporating said extracting solvent housed in the solvent container,
a filter device for holding a mixture,
a cooling device which communicates with the solvent container and the filter device and which is arranged to cool and condense solvent evaporated from the solvent container, whereby the solvent condensed by the cooling device is dropped into the filter device such that an extraction material in the mixture is extracted through the filter device,
a decompressor for decompressing the inside of said solvent container and said filter device to a pressure less than a pressure immediately exterior to said extracting apparatus, and
a solvent circulating means for, within said filter device, upwardly introducing and circulating a solvent staying at a lower portion of said mixture, to an upper portion thereof, including
a guide tube standing at the center inside of filter paper for introducing said solvent staying at a lower portion of said mixture; and
an aeration tube introduced in said guide tube for generating gas bubbles at a lower portion of said guide tube.

17. An extracting apparatus comprising:
a solvent container for housing an extracting solvent,
a heater for heating and evaporating said extracting solvent housed in the solvent container,
a filter device for holding a mixture,
a cooling device which communicates with the solvent container and the filter device and which is arranged to cool and condense solvent evaporated from the solvent container, whereby the solvent condensed by the cooling device is dropped into the filter device such that an extraction material in the mixture is extracted through the filter device,
a decompressor for decompressing the inside of said solvent container and said filter device to a pressure less than a pressure immediately exterior to said extracting apparatus,
a heating means for heating and evaporating said solvent,
a heating and thermally insulating means, surrounding said solvent container and said filter device, for heating said filter device with heat generated by said heating means, and for insulating said solvent container and said filter device from an exterior of said extracting device,
a metallic container interposed between said solvent container and said heating means,
a partition wall for partitioning, together with said metallic container, said heating means from said solvent container;
a pipe standing from the top of said partition wall and provided in an upper portion thereof with a throughhole through which the heat of said heating means is introduced to said solvent container and said filter device; and
a cover for preventing a solvent scattering from said filter device from entering the side of said heating means through said pipe.

18. An extracting apparatus comprising:
a solvent container for housing an extracting solvent,
a heater for heating and evaporating said extracting solvent housed in said solvent container,
a filter for holding a mixture and said solvent in a liquid form, and for removing solvent and said extraction material in said mixture,
a cooling device which communicates with the solvent container and said filter to cool and condenses the solvent evaporated from the solvent container and releases the solvent in liquid form to the filter, and a solvent circulator for circulating said solvent in liquid form in said filter.

19. An extracting apparatus according to claim 18, wherein said solvent circulator circulates said solvent by releasing gas bubbles.

20. An extracting apparatus according to claim 19, wherein said solvent circulator includes a tube inserted within said filter, said tube having holes at a lower end for releasing gas bubbles within said filter at a lower end of said filter.

21. An extracting apparatus according to claim 20, further comprising:

a decompressor for decompressing the pressure at least within said filter to obtain a lower pressure within said filter with respect to a pressure of an atmosphere exterior to said extracting apparatus, wherein said solvent circulator includes a gas line connecting said tube with the atmosphere exterior to said extracting apparatus and said solvent circulator circulates solvent by allowing gas of the exterior atmosphere through said gas line due to the lower pressure of said filter than said atmosphere exterior to said extracting apparatus.

22. An extracting apparatus of claim 21, wherein said solvent circulator includes a valve regulating the flow of gas through said gas line.

23. An extracting apparatus according to claim 22, wherein said extracting apparatus is a Soxhlet extracting apparatus.

* * * * *